US010118262B2

(12) United States Patent
Misaki

(10) Patent No.: US 10,118,262 B2
(45) Date of Patent: Nov. 6, 2018

(54) BEARING INSERTION DEVICE

(71) Applicant: NSK LTD., Tokyo (JP)

(72) Inventor: Kei Misaki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/555,420

(22) PCT Filed: Mar. 1, 2016

(86) PCT No.: PCT/JP2016/056278
§ 371 (c)(1),
(2) Date: Sep. 1, 2017

(87) PCT Pub. No.: WO2016/140226
PCT Pub. Date: Sep. 9, 2016

(65) Prior Publication Data
US 2018/0036844 A1    Feb. 8, 2018

(30) Foreign Application Priority Data

Mar. 2, 2015   (JP) .................................. 2015-039927

(51) Int. Cl.
*B23P 19/00*    (2006.01)
*B23P 19/02*    (2006.01)
(Continued)

(52) U.S. Cl.
CPC ............. *B23P 19/02* (2013.01); *B23P 21/008* (2013.01); *B62D 5/0454* (2013.01); *F04D 29/059* (2013.01)

(58) Field of Classification Search
CPC ....... B23P 11/00; B23P 11/005; B23P 11/022; B23P 11/027; B23P 19/00; B23P 19/10
See application file for complete search history.

(56) References Cited

U.S. PATENT DOCUMENTS 3,709,622 A * 1/1973 Morse .................. B23Q 37/002
144/48.3
4,571,841 A * 2/1986 Campbell .......... B23Q 17/2225
33/557
(Continued)

FOREIGN PATENT DOCUMENTS

JP    61199330 U    12/1986
JP    1127236 A    5/1989
(Continued)

OTHER PUBLICATIONS

Communication dated Jan. 31, 2018, from the European Patent Office in counterpart European Application No. 16758919.1.
(Continued)

*Primary Examiner* — Lee D Wilson
(74) *Attorney, Agent, or Firm* — Sughrue Mion, PLLC

(57) ABSTRACT

Provided is a bearing insertion apparatus in which a movable carriage is provided on a base placed on a floor surface in a manner of being movable in a horizontal Z-axis direction corresponding to a direction in which the movable carriage moves toward or away from a housing. In addition, an apparatus main body for supporting a rolling bearing at a distal end thereof is supported such that the apparatus main body can be freely moved, by a guide mechanism, with respect to the movable carriage in a horizontal X-axis direction orthogonal to the Z-axis direction and in a vertical Y-axis direction orthogonal to both of the Z-axis direction and the X-axis direction.

4 Claims, 7 Drawing Sheets

(51) Int. Cl.
  *B62D 5/04*   (2006.01)
  *B23P 21/00*  (2006.01)
  *F04D 29/059* (2006.01)

(56) References Cited

U.S. PATENT DOCUMENTS

| | | | | |
|---|---|---|---|---|
| 4,949,444 | A | * | 8/1990 | Kojima ............... B23B 3/06 29/27 R |
| 5,067,231 | A | | 11/1991 | Ueno et al. |
| 5,097,575 | A | * | 3/1992 | Mitsukuchi ........... B23B 3/06 29/27 C |
| 5,537,734 | A | * | 7/1996 | Belka ................. B23P 19/02 29/281.4 |
| 5,583,647 | A | * | 12/1996 | Izor ................. B23B 31/1622 358/3.32 |
| 2006/0191736 | A1 | | 8/2006 | Maeda et al. |
| 2018/0036844 | A1 | * | 2/2018 | Misaki ............... B23P 19/02 |

FOREIGN PATENT DOCUMENTS

| | | |
|---|---|---|
| JP | 2-274435 A | 11/1990 |
| JP | 4-256527 A | 9/1992 |
| JP | 737542 U | 7/1995 |
| JP | 200514734 A | 1/2005 |
| JP | 2008213667 A | 9/2008 |
| JP | 2011-143481 A | 7/2011 |

OTHER PUBLICATIONS

Database WPI, Week 201152, Thomson Scientific, London, GB; AN 2011-J53315, WPI / 2017 Clarivate Analytics, XP002777532, (2017) (2 Pages Total).

International Search Report dated Mar. 29, 2016, by the International Searching Authority in counterpart International Application No. PCT/JP2016/056278 (PCT/ISA/210).

Written Opinion dated Mar. 29, 2016, by the International Searching Authority in counterpart International Application No. PCT/JP2016/056278 (PCT/ISA/237).

* cited by examiner

BEARING INSERTION DEVICE

TECHNICAL FIELD

The present invention relates to improvement of a bearing insertion apparatus used to incorporate a rolling bearing into a housing or the like.

BACKGROUND ART

In order to give a steering angle to a steering wheel (front wheel in most vehicles except for special vehicles such as forklifts), as a device to reduce the force required for a driver to steer the steering wheel, a power steering device is widely used. As such a power steering device, an electric power steering device using an electric motor as an auxiliary power unit has been widely used in recent years. As to such an electric power steering device, various structures thereof are known. However, in any structure, auxiliary power of an electric motor is applied, via a reducer, to a rotation shaft that is rotated in accordance with operation of a steering wheel and which gives a steering angle to the steered wheel by being rotated. A worm reducer is typically used as the reducer. In the case of an electric power steering device using a worm reducer, a worm rotatably driven by an electric motor and a worm wheel rotating together with a rotation shaft are engaged so that the auxiliary power of an electric motor can be transmitted to the rotation shaft.

For example, Patent Document 1 discloses an electric power steering device as illustrated in FIGS. 4 and 5. A front end of a steering shaft 2 which is a rotation shaft rotated in a predetermined direction by a steering wheel 1 is rotatably supported in a housing 3, and a worm wheel 4 is fixed to this portion. A worm 6 engaged with the worm wheel 4 and rotatably driven by an electric motor 5 is formed by providing a worm tooth 8 at an axially middle portion of a worm shaft 7. A distal end of the worm shaft 7 is supported in the housing 3 by a distal end bearing 9 which is a rolling bearing such as a single row deep groove ball bearing and a base end of the worm shaft 7 is similarly supported by a proximal bearing 10 that is the same bearing as the distal end bearing.

In order to rotatably drive the worm 6 via an output shaft 11 of the electric motor 5, a spline hole 12 is formed in the base end of the worm shaft 7 such that the spline hole 12 is open at a base end surface of the worm shaft 7. Further, a distal end of the output shaft 11 is provided with a spline shaft portion 13. With the structure in which the spline shaft portion 13 is spline-locked to the spline hole 12, the output shaft 11 and the worm shaft 7 are coupled to transfer the rotational force.

In recent years, in order to improve a production rate of electric power steering devices having the structure described above, automation of assembling work for the electric power steering devices is progressing. Furthermore, automation of assembling work for worm reducers is also considered. The assembling work for a worm reducer is performed as illustrated in FIGS. 6A, 6B, and 6C and as described in Patent Document 2.

First, as illustrated in FIG. 6A, a distal end bearing 9 is inserted horizontally into a worm accommodation portion 14 having a substantially cylindrical shape with a bottom end and constituting a housing 3 through an opening of the accommodation portion 14, and is thus brought into contact with an abutting portion 15 of an inner peripheral surface of the worm accommodation portion 14. As a result, the distal end bearing 9 is internally fitted and fixed (press fitted) into a bearing receiving portion 16 provided at a deep inner portion of the worm accommodation portion 14. Thereafter, a worm wheel 4 is incorporated into a worm wheel accommodation portion 17 constituting the housing 3. Next, as sequentially illustrated in FIG. 6A and FIG. 6B, in a state in which the worm wheel 4 is engaged with a worm teeth 8, a worm 6 is inserted into the worm accommodation portion 14 while being rotated in a predetermined direction. Next, a distal end of the worm 6 is inserted into an inner portion of the distal end bearing 9. Finally, as illustrated in FIG. 6C, a base end bearing 10 is externally fitted and inserted from a base end side of the worm 6, and is internally fitted and fixed (press fitted) in a bearing receiving portion 18 formed at a middle portion of the inner peripheral surface of the worm accommodation portion 14.

Conventionally, assembling work for a worm reducer is performed according to the above-described work process. In such a work process, a process step at which the distal end bearing 9 is inserted into (internally fitted into) the bearing receiving portion 16 formed at a deep inner portion of the worm accommodation portion 14 is expected to be automated. However, there are the following problems in automating this process step.

That is, in the case of a typical power steering device, the bearing receiving portion 16 is formed at a position which is about 200 mm away from the opening of the worm accommodation portion 14, and there is merely a small margin (gap), usually about 10 μm, in a radial direction between the bearing receiving portion 16 and the outer peripheral surface of the distal end bearing 9. For this reason, when the distal end bearing 9 is inserted into the bearing receiving portion 16, an insertion position of a bearing needs to be highly precisely controlled. Furthermore, since the insertion step is performed by horizontally moving the distal end bearing 9, the insertion position is likely to be shifted downward due to the influence of gravity acting on the distal end bearing 9 and a support member that supports the distal end bearing 9. Further, due to a dimensional tolerance of the bearing receiving portion 16, the central axis of the bearing receiving portion 16 is likely to be deviated by about 0.6 mm with respect to a reference axis that lies with a dimensional tolerance of zero (0). For this reason, when the distal end bearing 9 is inserted, it is necessary to eliminate the misalignment (i.e. to perform alignment) based on the dimensional tolerance.

As other conventional documents related to the present invention, there is Patent Document 3 in addition to Patent Documents 1 and 2. Patent Document 3 discloses an invention relating to a rolling bearing insertion apparatus. However, in the case of the invention disclosed in Patent Document 3, a member (corresponding to the worm accommodation portion of the previous example) near a portion into which a rolling bearing is inserted needs to be provided with a centering shaft to be inserted into the rolling bearing. Therefore, the shape of the member disposed near the portion into which the rolling bearing is inserted is very limited. For example, in the structure in which the worm accommodation portion 14 integrally formed as illustrated in FIGS. 5, 6A, 6B, and 6C, the centering shaft cannot be provided. Therefore, such a structure cannot be adopted.

RELATED ART REFERENCE

Patent Document

Patent Document 1: JP-A-2008-213667
Patent Document 2: JP-A-2005-14734
Patent Document 3: JP-UM-A-H07-37542

SUMMARY OF THE INVENTION

Problems to be Solved by the Invention

The present invention has been made in view of the circumstances as described above. For example, the present invention is an invention to realize the structure of a bearing insertion apparatus that can automatically insert a rolling bearing even in the case in which an insertion distance of the rolling bearing is long, the case in which there is a small margin (gap) between the rolling bearing and a rolling bearing receiving portion in a radial direction, and further the case in which the rolling bearing is inserted into a bearing receiving portion whose dimensional tolerance needs to be considered when the rolling bearing is inserted, like a bearing receiving portion formed in a deep inner portion of a worm receiving portion for receiving a worm constituting a worm reducer.

Means for Solving the Problems

According to the present invention, a bearing insertion apparatus includes a base, a movable carriage, and an apparatus main body. Among these elements, the movable carriage is installed to be movable in a horizontal Z-axis direction (direction in which a rolling bearing moves toward and away from a member, such as a housing, into which the rolling bearing is to be inserted) on the base.

Further, the apparatus main body is supported to be freely movable with respect to the movable carriage in a predetermined direction (an X-axis direction and a Y-axis direction which will be described later).

In particular, in the case of the bearing insertion apparatus of the present invention, the apparatus main body includes an outer ring supporting cylinder and an inner ring clamping mechanism.

Of these, the outer ring supporting cylinder is an elongated hollow cylinder (having a length dimension longer than a distance between an opening of a member into which the rolling bearing is inserted and a bearing receiving portion). When a distal end surface of the outer ring supporting cylinder is brought into contact with a side surface of an outer ring constituting the rolling bearing, positioning of the rolling bearing in a Z-axis direction (direction in parallel with an axial direction of the rolling bearing) is performed.

Further, the inner ring clamping mechanism grips an inner peripheral surface of an inner ring constituting the rolling bearing by expanding and contracting a clamp main body provided at a portion protruding from the a distal end of the outer ring supporting cylinder.

The apparatus main body equipped with the outer ring supporting cylinder and the inner ring clamping mechanism is freely movable relative to the movable carriage by a guide mechanism in a horizontal X-axis direction orthogonal to the Z-axis direction and in a vertical Y-axis direction orthogonal to both of the Z-axis direction and the X-axis direction (free movement of the apparatus main body is permitted), and the apparatus main body is floatingly supported (suspended) from the underside thereof by, for example, a cylinder or an elastic member in a state of being movable in the Y-axis direction within a predetermined range.

In addition, the rolling bearing to be inserted by the bearing insertion apparatus of the present invention is a radial rolling bearing that includes an annular outer ring having an outer ring raceway on its inner peripheral surface, an annular inner ring having an inner ring raceway on its outer peripheral surface, and a plurality of rolling elements provided to freely roll between the outer ring raceway and the inner ring raceway, the radial rolling bearing further including a cage for holding each of the rolling elements and a sealing device for preventing entry of foreign matter as necessary.

Further, the rolling bearing is not limited to a single row rolling bearing but may be a double row rolling bearing, and the rolling elements constituting the rolling bearing are not limited to balls but may be various rollers (cylindrical rollers, tapered rollers, spherical rollers, needles, etc.).

In the case of implementing the bearing insertion apparatus of the present invention as described above, the guide mechanism may include at least one horizontal linear guide allowing movement of the apparatus main body in the X-axis direction with respect to the movable carriage, and at least one vertical linear guide allowing movement of the apparatus main body in the Y-axis direction with respect to the movable carriage.

In the case of implementing the bearing insertion apparatus of the present invention, the apparatus main body may be provided with a cylinder driving device, thereby moving the outer ring supporting cylinder in the Z-axis direction independently of the inner ring clamping mechanism.

Advantages of the Invention

According to the bearing insertion apparatus of the present invention constructed as described above, even in the case in which the insertion distance of the rolling bearing is long, the case in which the margin in the radial direction between the rolling bearing and the bearing receiving portion is small, and further the case in which the rolling bearing is inserted into a bearing receiving portion having a dimensional tolerance that needs to be considered for insertion work, like the bearing receiving portion formed at an deep inner portion of the worm accommodation portion for accommodating the worm constituting the worm reducer, the rolling bearing can be automatically inserted.

That is, in the case of the bearing insertion apparatus of the present invention, in a state in which the rolling bearing is stably seated by gripping the inner ring constituting the rolling bearing with the inner ring clamping mechanism constituting the apparatus main body, and by bring the distal end surface of the outer ring supporting cylinder constituting this apparatus main body into contact with a side surface of the outer ring constituting the rolling bearing, the movable carriage supporting the apparatus main body is horizontally moved with respect to the base in the Z-axis direction to insert the rolling bearing into the bearing receiving portion.

In this way, in the case of the present invention, the rolling bearing is inserted in a state where the distal end surface of the outer ring supporting cylinder is in contact with the side surface of the outer ring constituting the rolling bearing. Therefore, by directly measuring the force (reaction force) acting on the outer ring supporting cylinder in the Z-axis direction or measuring the magnitude of the force (for example, torque) acting on the driving unit for driving the movable carriage, it is possible to detect the fact that the rolling bearing is inserted into the deep inner portion of the bearing receiving portion. Therefore, even when the insertion distance of the rolling bearing is long, it is possible to prevent an insertion amount from being insufficient, and it is possible to reliably insert the rolling bearing into the bearing receiving portion.

In addition, in the case of the present invention, the apparatus main body can be freely moved with respect to the movable carriage by the guide mechanism in the X-axis direction (horizontal direction) and in the Y-axis direction (vertical direction). Therefore, when the rolling bearing supported on the distal end of the apparatus main body is moved in the horizontal direction within the housing, for example, even in the case in which the central axis of the bearing receiving portion and the central axis of the rolling bearing do not coincide with each other due to the tolerance of the bearing receiving portion, with the use of the structure in which the outer peripheral surface (particularly the chamfered portion) of the outer ring constituting the rolling bearing is in contact with the inner surface of the housing, it is possible to move the rolling bearing in the radial direction (align the apparatus main body in the X-axis direction and/or the Y-axis direction). Therefore, according to the bearing insertion apparatus of the present invention, even in the case where the margin in the radial direction between the rolling bearing and the bearing receiving portion is small and further in the case in which the dimensional tolerance needs to be considered for insertion work, the rolling bearing is automatically appropriately moved in the radial direction such that the central axis of the rolling bearing and the central axis of the bearing receiving portion are automatically to coincide (be aligned) with each other or to be brought closer to each other.

As a result, according to the present invention, it is possible to automatically insert a rolling bearing into a bearing receiving portion which was considered a portion into which a rolling bearing cannot be easily inserted.

MODES FOR CARRYING OUT THE INVENTION

First Example of Embodiment

Figure 1:
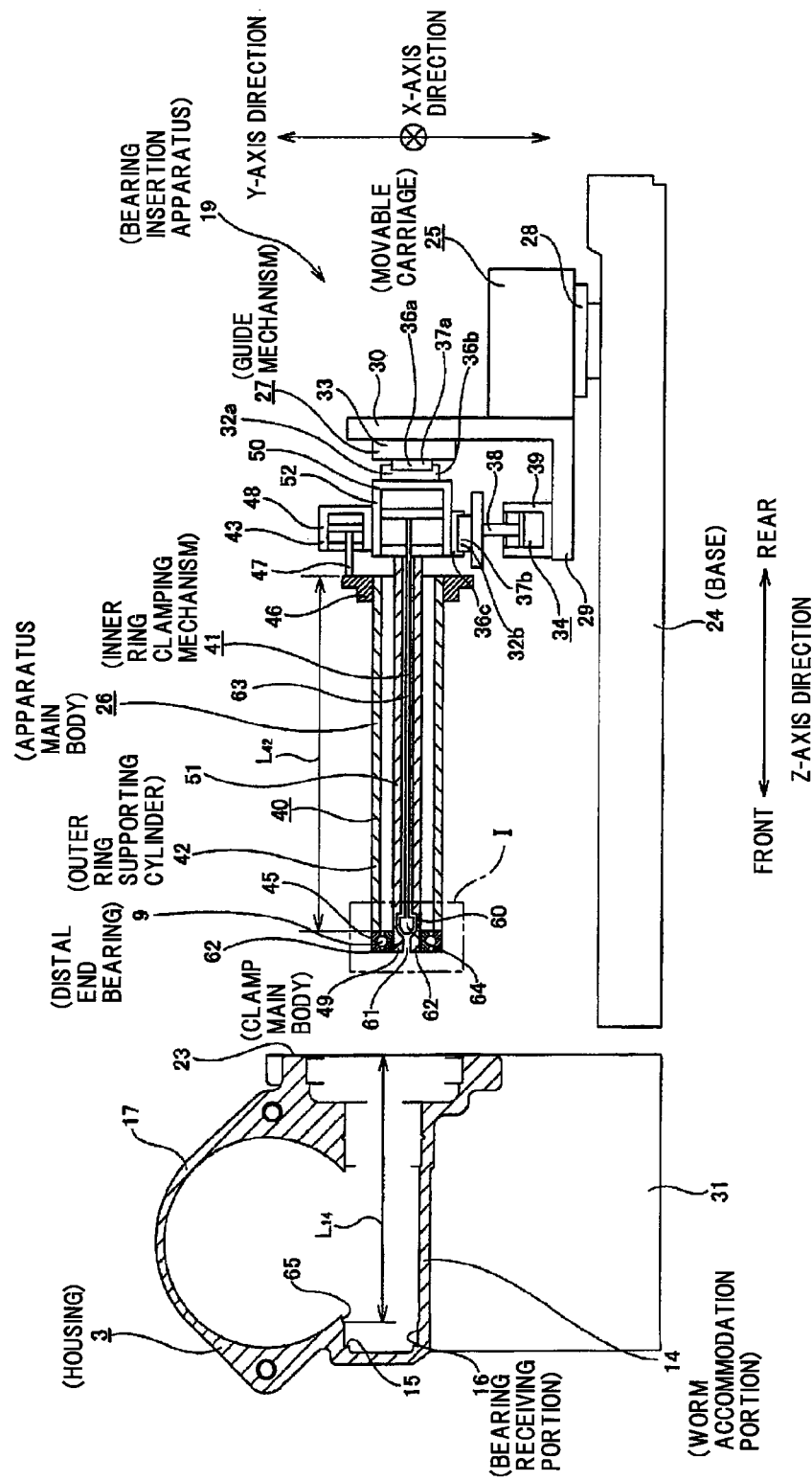
FIG. 1 is a schematic view illustrating a process of inserting a rolling bearing into a worm accommodation portion using a bearing insertion apparatus according to a first example of an embodiment of the present invention.

A first example of one embodiment of the present invention will be described with reference to FIGS. 1, 2A, and 2B. According to this example, a bearing insertion apparatus 19 is an apparatus for automatically inserting a distal end bearing 9 that is a work piece into a bearing receiving portion 16 formed in a worm accommodation portion 14 for accommodating a worm 6 (see FIGS. 5, 6A, 6B, and 6C) constituting a worm reducer. First, before describing the bearing insertion apparatus 19 of the present example, the distal end bearing 9 that is a subject to be inserted by the bearing insertion apparatus 19 of the present example, and the worm accommodation portion 14 into which the distal end bearing 9 is to be inserted will be described in brief.

Figure 2:
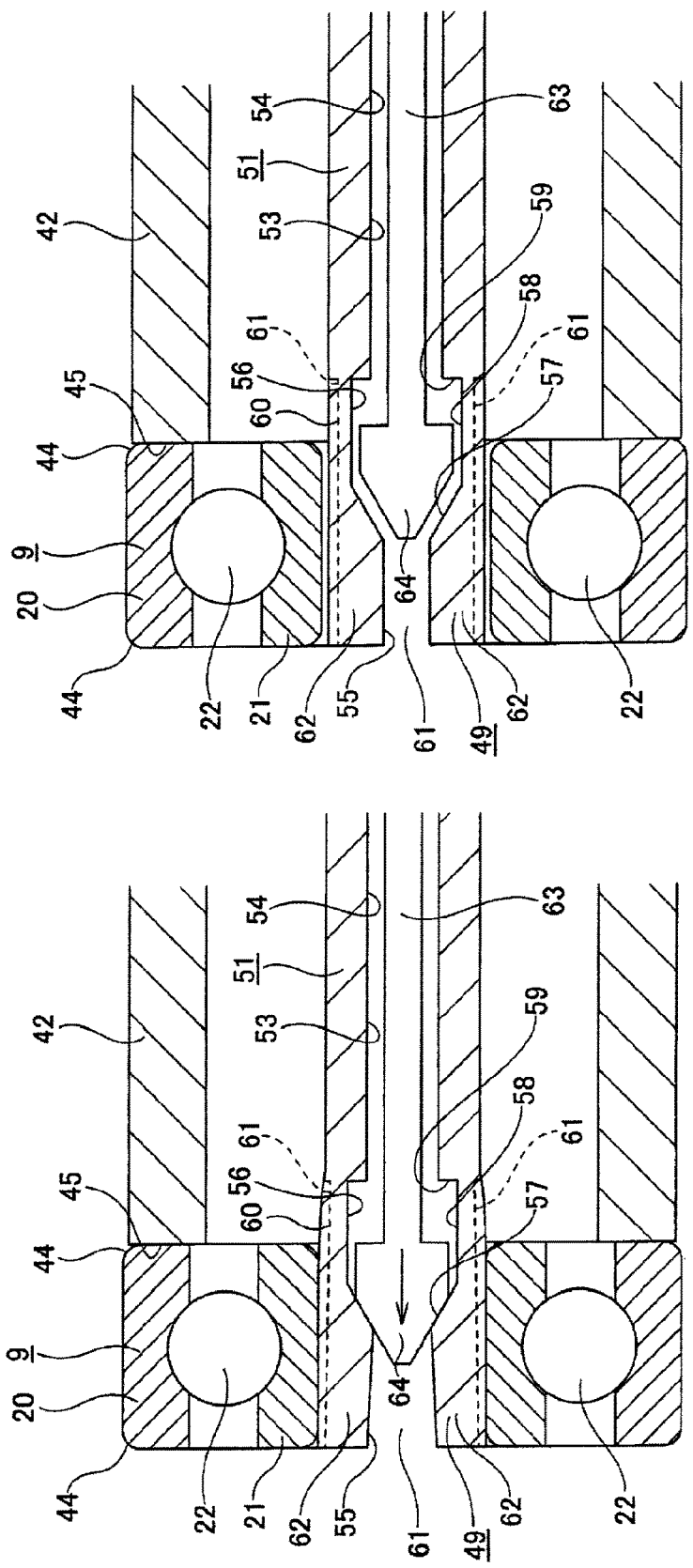
FIG. 2A is an enlarged view of a portion I of FIG. 1 before being clamped.
FIG. 2B is an enlarged view of the portion I of FIG. 1 after being clamped.

As illustrated in FIGS. 2A and 2B, the distal end bearing 9 is a single row deep groove radial ball bearing and includes an annular outer ring 20 having an outer ring raceway on the inner peripheral surface thereof, an annular inner ring 21 having an inner ring raceway on the outer peripheral surface thereof, and a plurality of balls 22 and 22 rollably disposed between the outer ring raceway and the inner ring raceway. The distal end bearing 9 functions to rotatably support a distal end of the worm 6 in the worm accommodation portion 14. Chamfered portions 44 and 44 having an arc-shaped cross section are provided at respective corners between both side surfaces of the outer ring 20 in the axial direction and the outer peripheral surface of the outer ring 20.

The worm accommodation portion 14 is provided in a portion of a housing 3 for accommodating a worm reducer constituting an electric power steering device and is made of an aluminum alloy, a synthetic resin or the like. The worm accommodation portion 14 has a substantially cylindrical shape with a bottom end. The worm accommodation portion 14 has an internal space communicating with an internal space of a worm wheel accommodation portion 17 for accommodating a worm wheel 4 (see FIGS. 5, 6A, 6B, and 6C). In addition, a deep inner portion of the inner peripheral surface of the worm accommodation portion 14 having this structure is provided with an abutting portion (stepped surface) 15 that exists on an imaginary plane orthogonal to the central axis of the worm accommodation portion 14. Of the deep inner portion of the inner peripheral surface of the worm accommodation portion 14, a portion of the abutting portion 15 in the vicinity of an opening is provided with a single cylinder-shaped bearing receiving portion 16. The inner diameter of the bearing receiving portion 16 is set to be larger than the outer diameter of the outer ring 20 of the distal end bearing 9 by about 10 μm. The distance (horizontal distance) L14 from a motor side end surface 23 located at the opening of the worm accommodation portion 14 to the bearing receiving portion 16 is about 200 mm.

Next, the bearing insertion apparatus 19 of the present example will be described in detail.

The bearing insertion apparatus 19 includes a base 24, a movable carriage 25, an apparatus main body 26, a guide mechanism 27, and an NC device (not illustrated).

Among these, the base 24 is placed horizontally on the floor surface of a factory. A driving mechanism 28 including a drive motor and a ball screw device (not illustrated) is provided on the base 24. The movable carriage 25 provided on the base 24 is moved in a horizontal Z-axis direction (left-right direction in FIG. 1, direction in which the movable carriage 25 moves toward and away from the housing 3) based on a movement command transmitted from the NC device. The movable carriage 25 includes a first mounting plate 29 extending in the horizontal direction and a second mounting plate 30 extending in a vertical direction.

FIG. 1 illustrates a state before the movable carriage 25 is moved in the Z-axis direction (state of being positioned at the origin). A mount 31 is placed on the floor surface and on the front side (left side in FIG. 1) of the movable carriage 25 in a direction in which the movable carriage 25 moves. The housing 3 is fixed on the mount 31 in a state in which the opening of the worm accommodation portion 14 faces the bearing insertion apparatus 19.

The apparatus main body 26 is supported by a guide mechanism 27 to be freely movable in a predetermined direction with respect to the movable carriage 25 described above. The guide mechanism 27 includes two horizontal linear guides 32a and 32b and one vertical linear guide 33. One horizontal linear guide 32a of the two horizontal linear guides and the vertical linear guide 33 are combined with each other to form a cross shape, and the combined structure is provided between the front surface (left side surface of FIG. 1) of the second mounting plate 30 constituting the movable carriage 25 and the apparatus main body 26 (cylinder main body 52 described later). The other horizontal linear guide 32b is provided, via an air cylinder 34, between the upper surface of the first mounting plate 29 constituting the movable carriage 25 and the lower surface of the apparatus main body 26 (cylinder main body 52).

Both of the horizontal linear guides 32a and 32b allow the apparatus main body 26 to freely move with respect to the movable carriage 25 in a horizontal X-axis direction (front-and-rear direction in FIG. 1) orthogonal to the Z-axis direction. Meanwhile, the vertical linear guide 33 allows the apparatus main body 26 to freely move with respect to the movable carriage 25 in a vertical Y-axis direction (vertical direction in FIG. 1) orthogonal to both of the Z-axis direction and the X-axis direction. The combined structure of one horizontal linear guide 32a of the two horizontal linear guides and the vertical linear guide 33 which are combined to form a cross shape includes a pair of guide rails 36a and 36b, one slider 37a, and a plurality of rolling elements (not illustrated). That is, the slider 37a is disposed to straddle inside the guide rails 36a and 36b, arranged to be orthogonal to each other, with a plurality of rolling elements provided between the slider and the guide rails such that the slider 37a is movable along the longitudinal direction of the guide rails 36a and 36b. The other horizontal linear guide 32b includes a guide rail 36c, a slider 37b, and a plurality of rolling elements (not illustrated). The slider 37b is arranged to straddle inside the guide rail 36c with a plurality of rolling elements provided therebetween so as to be movable along a longitudinal direction of the guide rail 36c.

In addition, although not illustrated in the drawing, it is possible to adopt a structure in which movement of both of the sliders 37a and 37b is stopped at predetermined positions, such as longitudinal middle positions of the guide rails 36a, 36b, and 36c by an additional cylinder device.

Instead of the horizontal linear guide 32a, a floating joint which may be used in combination with an air cylinder device in a machine tool or the like can be used. In this case, a base end of the floating joint is supported on and fixed to the slider 37a, and a distal end of the floating joint is fixed to the apparatus main body 26 (cylinder main body 52). With this structure, the apparatus main body 26 is supported to be slightly displaced with respect to the slider 37a in the X-axis direction (for example, by a displacement of about 1 mm).

The air cylinder 34 is provided to prevent the apparatus main body 26, which can be moved in the Y-axis direction with respect to the movable carriage 25 by the vertical linear guide 33, from moving downward due to gravity or the like. The air cylinder 34 includes a piston 38 and a cylinder main body 39 fitted with the piston 38, and the piston 38 of the air cylinder 34 applies an upward force to the apparatus main body 26. As a result, the apparatus main body 26 is floatingly supported from the underside thereof at a predetermined height while movement of the apparatus main body 26 in the Y-axis direction is allowed within a predetermined range. Specifically, the air cylinder 34 applies a force of a magnitude corresponding to the gravity acting on the apparatus main body 26 and the distal end bearing 9 supported by the apparatus main body 26. Therefore, when an upward or downward external force acts on the apparatus main body 26 during insertion work, upward or downward movement of the apparatus main body 26 is allowed within a range in which the piston 38 can be displaced.

The apparatus main body 26 includes an outer ring supporting mechanism 40 and an inner ring clamping mechanism 41. The outer ring supporting mechanism 40 includes an outer ring supporting cylinder 42 and a cylinder driving device 43 which is a hydraulic cylinder device or an air cylinder device. The outer ring supporting cylinder 42 is an elongated hollow cylinder. A distal end surface 45 of the outer ring supporting cylinder 42 is brought into contact with one side surface (right side surface in FIGS. 1, 2A, and 2B) of the outer ring 20 constituting the distal end bearing 9, so that positioning of the distal end bearing 9 in the Z-axis direction (direction in parallel with an axial direction of the distal end bearing 9) is performed. The total length L42 of the outer ring supporting cylinder 42 is longer than the distance L14 from the motor side end surface 23 of the worm accommodation portion 14 to the bearing receiving portion 16 of the worm accommodation portion 14 (L42>L14). Further, in the case of the illustrated structure, the outer diameter of a portion of the outer ring supporting cylinder 42, excluding the base end thereof externally fitted with a mounting flange 46 described later, is set to be constant over the entire length, and to be slightly smaller than the outer diameter of the outer ring 20. However, depending on the shape the inner surface of the worm accommodation portion, the distal end of the outer ring supporting cylinder may be provided with a tapered portion, and the outer diameter of a middle portion of the outer ring supporting cylinder may be larger than the outer diameter of the outer ring 20. The distal end surface 45 of the outer ring supporting cylinder 42 is formed in a circular ring shape existing on an imaginary plane orthogonal to the central axis of the outer ring supporting cylinder 42. The outer diameter of the distal end surface 45 of the outer ring supporting cylinder is slightly smaller than the outer diameter of the outer ring 20, and the inner diameter of the distal end surface 45 is equal to or smaller than the inner diameter of the outer ring 20. Although not illustrated in the drawing, the inner diameter of the distal end surface 45 can be set to be smaller than the outer diameter of the inner ring 21.

A circular ring-shaped mounting flange 46 is externally fitted on and fixed to the outer peripheral surface of the base end of the outer ring supporting cylinder 42. A distal end of a driving rod 47 constituting the cylinder driving device 43 is connected to a portion (upper end) of the mounting flange 46. A base end of the driving rod 47 is fitted in the cylinder main body 48, and can be moved in the Z-axis direction by supplying or discharging pressurized oil or air to or from the cylinder main body 48 based on a command instruction of an NC device. In the case of the present example, the outer ring supporting cylinder 42 is supported around an intermediate cylinder 51, which will be described later, constituting the inner ring clamping mechanism 41 via a sliding bearing (not illustrated) such that the outer ring supporting cylinder 42 can be guided to be displaced in the Z-axis direction.

The inner ring clamping mechanism 41 includes a clamp main body 49, a clamp driving device 50 which is a hydraulic cylinder device or an air cylinder device, and the intermediate cylinder 51. Among these, the intermediate cylinder 51 is made of a metal such as an aluminum alloy or stainless steel and has a substantially cylindrical shape. The intermediate cylinder 51 is concentrically arranged inside the outer ring supporting cylinder 42. A base end (right end in FIG. 1) of the intermediate cylinder 51 is connected and fixed to the cylinder main body 52 constituting the clamp driving device 50. In this state, the distal end (left end in FIG. 1) of the intermediate cylinder 51 is arranged to protrude from the distal end of the outer ring supporting cylinder 42 in the Z-axis direction. The intermediate cylinder 51 is provided with a through hole 53 passing through the intermediate cylinder in the Z-axis direction. The through hole 53 includes a small diameter hole portion 54 having a constant inner diameter and extending from the base end of the intermediate cylinder 51 to the vicinity of the distal end thereof, an open hole portion 55 having an inner diameter larger than that of the small diameter hole portion 54 and being provided at the distal end of the intermediate cylinder 51, and an accommodation hole portion 56 provided between the small diameter hole portion 54 and the open hole portion 55. The accommodation hole portion 56 includes a partially conical and concavely inclined surface portion 57 being continuous to the inner peripheral surface of the open hole portion 55 and being inclined such that the inner diameter thereof decreases as approaching the open hole portion 55, a cylindrical surface portion 58 formed to be nearer the smaller diameter hole portion 54 than the inclined surface portion 57 and having a constant inner diameter, a stepped surface portion 59 for connecting the cylindrical surface portion 58 and the inner peripheral surface of the small diameter hole portion 54 to each other. In the case of the present example, by forming the accommodation hole portion 56 having the structure described above, a thin wall portion 60 having the cylindrical surface portion 58 at the inner peripheral surface thereof is formed around the accommodation hole portion 56. Further, at a plurality of positions in a circumferential direction of the distal end of the intermediate cylinder 51, slits 61 and 61 are formed to extend in the Z-axis direction in which respective base ends of the slits are positioned to be aligned with the stepped surface portion 59 in the Z-axis direction, and distal ends of the slits are open at the distal end edge of the intermediate cylinder 51. Within the distal end of the intermediate cylinder 51, portions provided between the slits 61 and 61 in the circumferential direction thereof are called expansion and contraction portions 62 and 62. In the case of the present example, the clamp main body 49 is constituted by portions (distal ends) of the expansion and contraction portions 62 and 62, which protrude from the distal end of the outer ring supporting cylinder 42. The outer diameter of the clamp main body 49 is slightly smaller than the inner diameter of the inner ring 21 in a state where the clamp main body 49 is not driven (i.e., the inner ring 21 is not clamped).

The clamp driving device 50 is a hydraulic cylinder device or an air cylinder device and includes a piston rod 63 disposed inside the intermediate cylinder 51 and a cylinder main body 52 in which a base end of the piston rod 63 is fitted. The cylinder main body 52 is supported to be displaced with respect to the second mounting plate 30 in the X-axis direction and the Y-axis direction by the horizontal linear guide 32a and the vertical linear guide 33. The cylinder main body 52 is supported to be displaced with respect to the first mounting plate 29 in the X-axis direction by the other horizontal linear guide 32b, and is floatingly supported from the underside thereof to be moved within a predetermined range in the Y-axis direction by the air cylinder 34. The clamp driving device 50 allows the piston rod 63 to move in the Z-axis direction by supplying or discharging pressurized oil or air to or from the cylinder main body 52 based on a command instruction transmitted from the NC device.

The distal end of the piston rod 63 is provided with a cam portion 64 having a partially conical pillar-shaped distal end whose outer diameter decreases toward a distal end thereof. The cam portion 64 is disposed in the accommodation hole portion 56 formed inside the intermediate cylinder 51, and the outer peripheral surface of the distal end of the cam portion 64 is opposed to the inclined surface portion 57.

In order to grip the inner peripheral surface of the inner ring 21 with the clamp main body 49 of the present example, in a state in which the clamp main body 49 is inserted into the inner ring 21, the cam portion 64 is moved forward in the Z-axis direction. As a result, the outer peripheral surface of the distal end of the cam portion 64 is pressed against the inclined surface portion 57, so that each of the expansion and contraction portions 62 and 62 is pushed outward to be expanded in a radial direction from the base end thereof (i.e., the width dimension of each slit 61 in a circumferential direction increases). Next, the outer peripheral surfaces of the expansion and contraction portions 62 and 62 are pressed against the inner peripheral surface of the inner ring 21, thereby gripping (clamping) the inner ring 21 with a predetermined holding force. On the other hand, when releasing the clamp, the cam portion 64 (piston rod 63) is moved backward in the Z-axis direction in the accommodation hole portion 56. Due to this operation, the expansion and contraction portions 62 and 62 are elastically restored, thereby reducing the force of holding the inner ring 21 (i.e. the force becomes zero). In this way, in the case of the present example, each of the expansion and contraction portions 62 and 62 functions as a leaf spring.

The operation in which the bearing insertion apparatus 19 of the present example inserts the distal end bearing 9 into the bearing receiving portion 16 formed at a deep inner portion of the inner peripheral surface of the worm accommodation portion 14 will be described below.

First, the distal end bearing 9 is automatically supplied by a bearing supply device (not illustrated) and is set in the bearing insertion apparatus 19. That is, the clamp main body 49 (the distal ends of the expansion and contraction portions 62 and 62) is inserted to be disposed inside the inner ring 21 and one side surface of the outer ring 20 is brought into contact with the distal end surface 45 of the outer ring supporting cylinder 42. In this state, the bearing insertion apparatus 19 of the present example supplies or discharges pressurized oil or air to or from the cylinder main body 52 constituting the inner ring clamping mechanism 41 based on an instruction of the NC device, thereby moving the piston rod 63 forward in the Z-axis direction. Thus, the expansion and contraction portions 62 and 62 are pushed outward to be expanded in the radial direction by the outer peripheral surface of the distal end of the cam portion 64, thereby clamping the inner peripheral surface of the inner ring 21 with a predetermined holding force.

In the case of the present example, as described above, in a state in which the distal end bearing 9 is clamped by the clamp main body 49, positioning of the apparatus main body 26 in the Y-axis direction is preliminarily performed by the air cylinder 34 or the like and positioning of the apparatus main body 26 in the X-axis direction is also preliminarily performed so that the central axis of the distal end bearing 9 can be positioned in the vicinity of the central axis of the bearing receiving portion 16 (within at least tolerance range).

Next, the movable carriage 25 provided on the base 24 and the apparatus main body 26 supported by the movable carriage 25 are moved forward (moved in parallel) in the Z-axis direction based on the instruction of the NC device. As a result, the distal end bearing 9 clamped by the clamp main body 49 is inserted into the worm accommodation portion 14 through the opening of the worm accommodation portion. During the insertion operation, when the outer peripheral surface (mainly the chamfered portion 44) of the outer ring 20 constituting the distal end bearing 9 is brought into contact with the inner peripheral surface (for example, the inclined surface 65 formed on the opening side of the bearing receiving portion 16) of the worm accommodation portion 14, the distal end bearing 9 is automatically moved in the radial direction (X-axis direction and Y-axis direction) (i.e. automatically moved by the pressing force acting in the Z-axis direction), and continuously inserted in the Z-axis direction. The insertion operation is continuously performed until the fact that the remaining side surface (the left side surface in FIGS. 1, 2A, and 2B) of the outer ring 20 constituting the distal end bearing 9 is brought into contact with the abutting portion 15 is detected based on the magnitude of the rotational torque of the drive motor that drives the movable carriage 25. When the state is detected, driving of the movable carriage 25 is stopped. In the present example, in this state, the distal end bearing 9 is inserted (internally fitted) into the bearing receiving portion 16. In addition, in the case of the present example, the NC device monitors not only the magnitude of the rotational torque of the drive motor that drives the movable carriage 25 but also the position (position in the Z-axis direction) of the movable carriage 25. As a result, when the rotational torque increases before the distal end bearing 9 reaches a predetermined target insertion position (i.e. when the distal end bearing 9 moves by an amount of reaching a position 2 mm or more ahead the predetermined target insertion position in the Z-axis direction), it is determined that an abnormality has occurred and the insertion operation is stopped. The position at which it is determined that an abnormality has occurred based on the increased rotational torque is not limited to a position that is 2 mm or more ahead the target insertion position, but other positions can be set as appropriate.

Next, pressurized oil or air is supplied to or discharged from the cylinder main body 52 constituting the inner ring clamping mechanism 41 to move the piston rod 63 and the cam portion 64 backward in the Z-axis direction. As a result, the expansion and contraction portions 62 and 62 are elastically restored to reduce the holding force of holding the inner ring 21. At the same time, pressurized oil or air is supplied to or discharged from the cylinder main body 48 constituting the outer ring supporting mechanism 40 to move the outer ring supporting cylinder 42 forward in the Z-axis direction, independently of the inner ring clamping mechanism 41, via the driving rod 47 and the mounting flange 46. As a result, the remaining side surface of the outer ring 20 is pressed against the abutting portion 15, and the outer peripheral surfaces of the expansion and contraction portions 62 and 62 are completely separated from the inner peripheral surface of the inner ring 21.

Next, conversely, pressurized oil or air is supplied to or discharged from the cylinder main body 48 to move the outer ring supporting cylinder 42 backward in the Z-axis direction, such that the distal end surface 45 of the outer ring supporting cylinder 42 is separated from one side surface of the outer ring 20. Finally, the movable carriage 25 and the apparatus main body 26 are moved backward in the Z-axis direction, thereby being returned to the original position.

According to the bearing insertion apparatus 19 of the present example having the above-described structure, the distal end bearing 9 can be automatically inserted into the bearing receiving portion 16 formed at a deep inner portion of the worm accommodation portion 14.

That is, in the case of the bearing insertion apparatus 19 of the present example, since inserting the distal end bearing 9 is performed in a state in which the distal end surface 45 of the outer ring supporting cylinder 42 is in contact with one side surface of the outer ring 20, it is possible to detect a state in which the distal end bearing 9 is in contact with the abutting portion 15 based on the magnitude of the rotational torque of the drive motor that drives the movable carriage 25. Therefore, even when the insertion distance of the distal end bearing 9 is long as in the present example, it is possible to prevent an insertion amount from being insufficient, and to reliably insert the distal end bearing 9 into the bearing receiving portion 16.

In the case of the present example, the apparatus main body 26 can be freely moved with respect to the movable carriage 25 in the X-axis direction and the Y-axis direction by the horizontal linear guides 32a and 32b and the vertical linear guide 33. Therefore, even when the central axis of the bearing receiving portion 16 and the central axis of the distal end bearing 9 does not coincide with each other due to the tolerance and the like of the bearing receiving portion 16 during the above-described insertion operation, the apparatus main body 26 can be moved in the X-axis direction and the Y-axis direction and the distal end bearing 9 can be moved (aligned) in the radial direction based on the contact between the outer peripheral surface (for example, the chamfered portion 44) of the outer ring 20 constituting the distal end bearing 9 and the inner peripheral surface (for example, the inclined surface 65) of the worm accommodation portion 14. Therefore, according to the bearing insertion apparatus 19 of the present example, even when the margin in the radial direction between the bearing receiving portion and the distal end bearing 9 is small and the dimensional tolerance needs to be considered in an insertion process, like the bearing receiving portion 16 formed in the worm accommodation portion 14, the distal end bearing 9 is automatically appropriately moved in the radial direction, and thus the central axis of the distal end bearing 9 and the central axis of the bearing receiving portion 16 can be automatically coincide (be aligned) with each other or brought closer to each other.

As a result, according to the bearing insertion apparatus 19 of the present example, even with respect to a bearing receiving portion that is considered a portion into which a rolling bearing cannot be automatically inserted, like the bearing receiving portion 16 formed in the worm accommodation portion 14 for accommodating the worm 6 constituting the worm reducer, it is possible to automatically insert a rolling bearing.

Second Example of Embodiment

Figure 3:
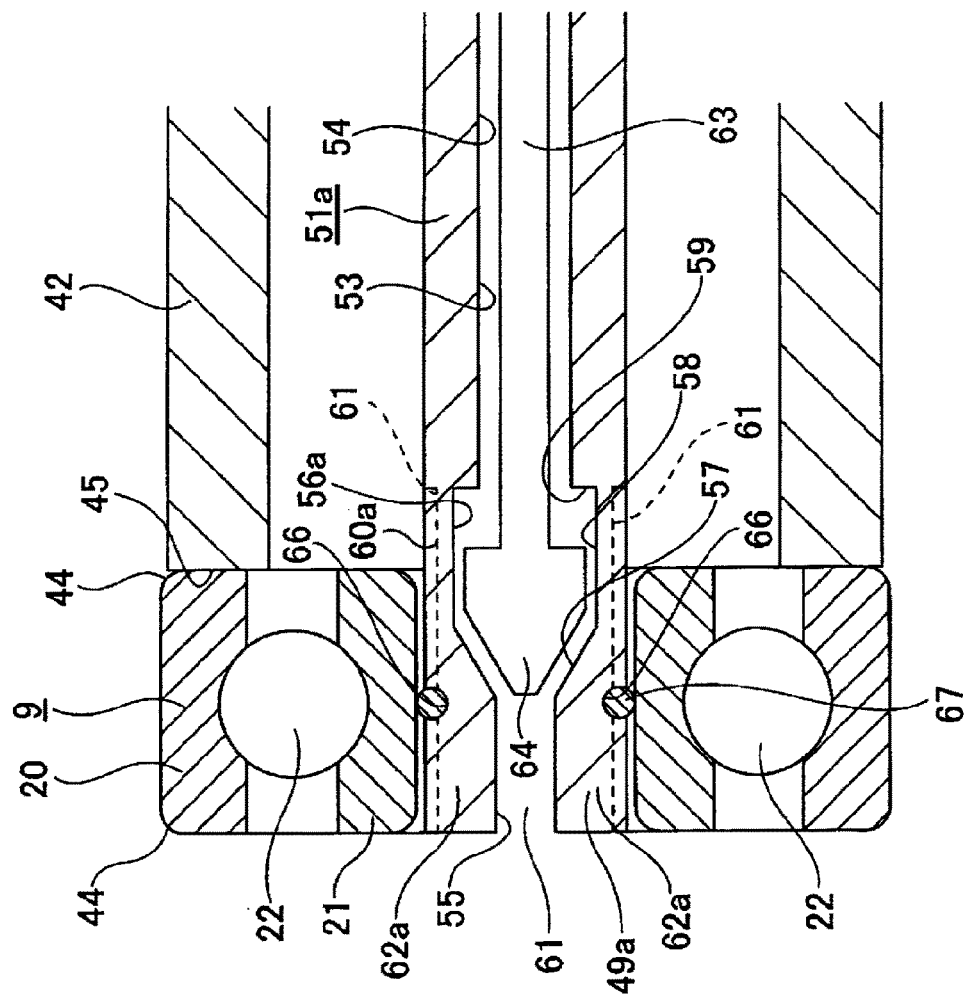
FIG. 3 is an enlarged view of a main part in a state before being clamped, according to a second example of the embodiment of the present invention.
Figure 4:
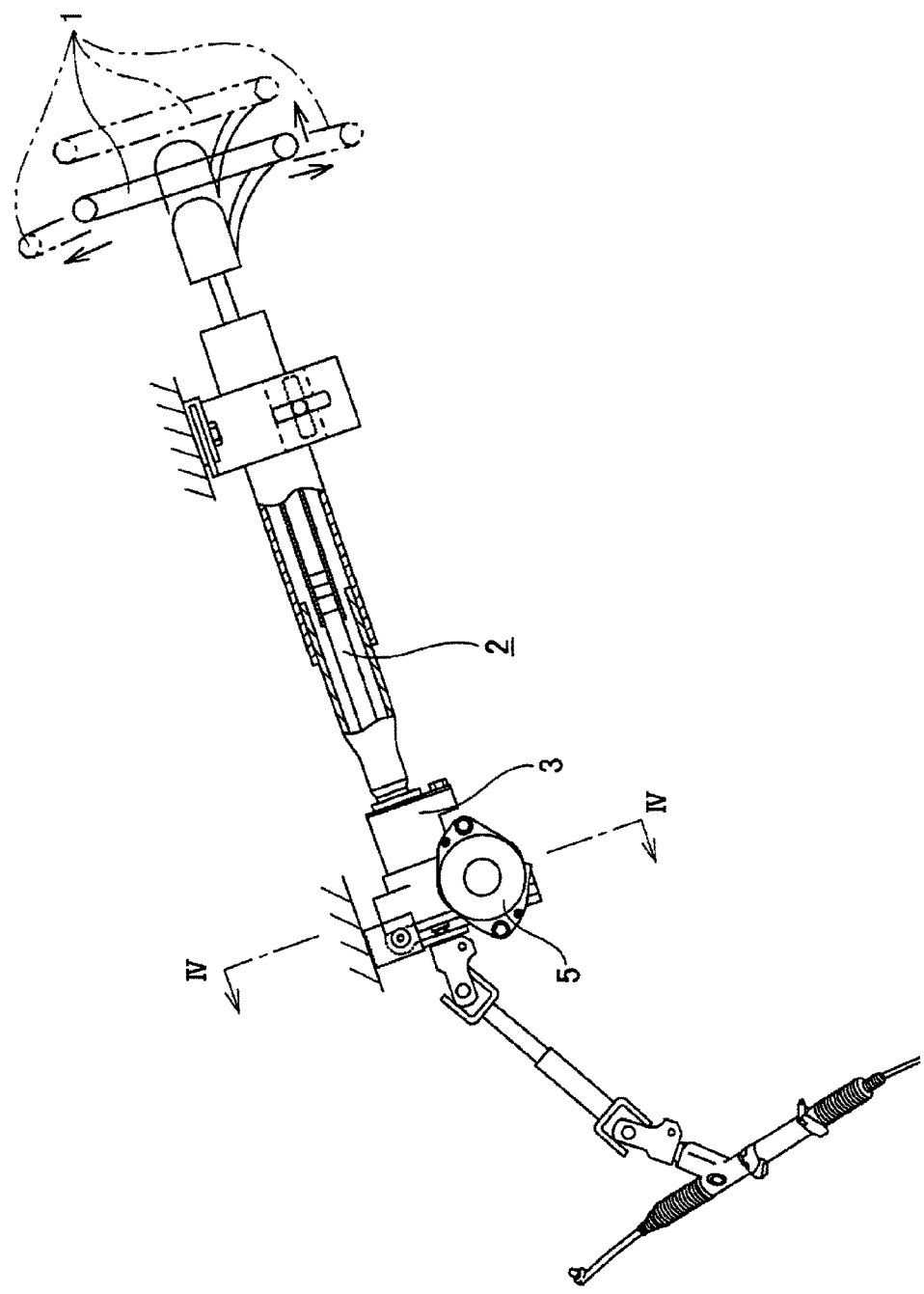
FIG. 4 is a partially cutaway side view illustrating an example of a steering device for an automobile equipped with an electric power steering device.
Figure 5:
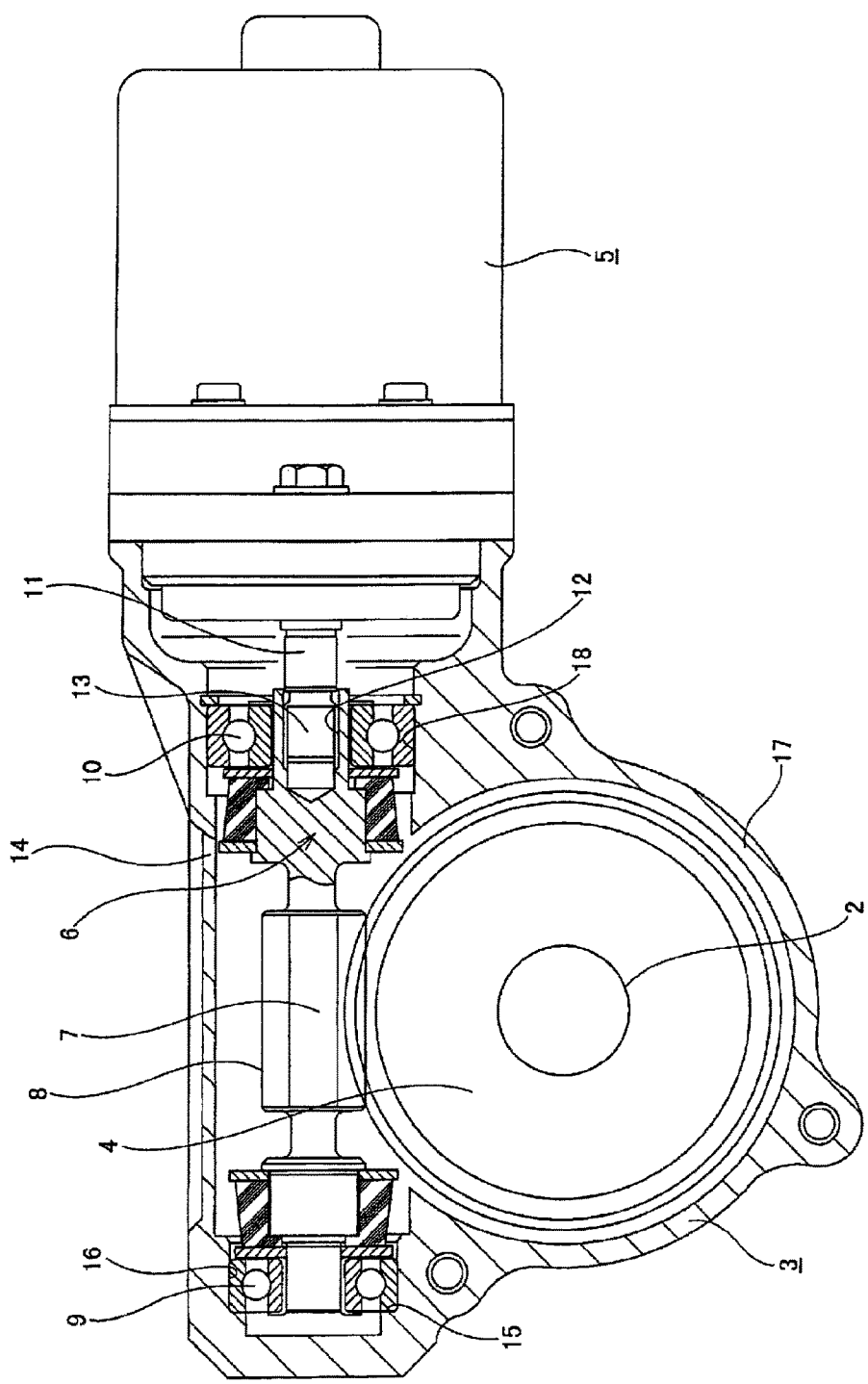
FIG. 5 is a cross-sectional view taken along a line IV-IV of FIG. 4.
Figure 6A:
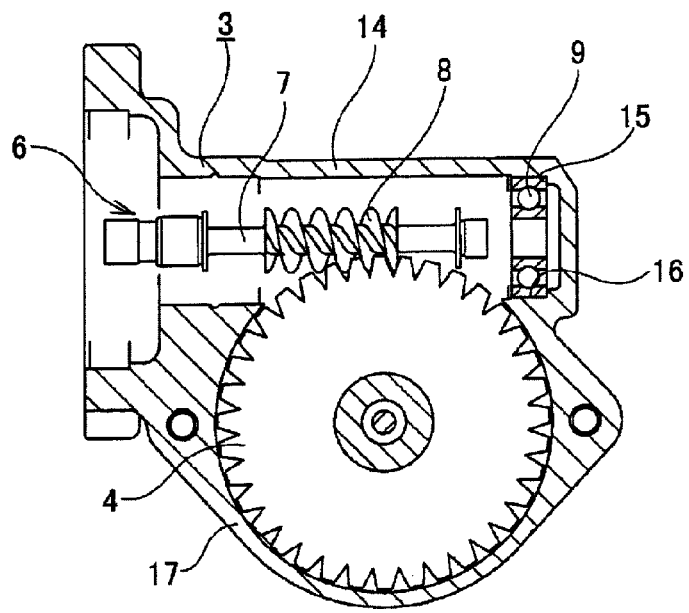
FIG. 6A is a cross-sectional view illustrating an assembling process of a worm reducer.
Figure 6B:
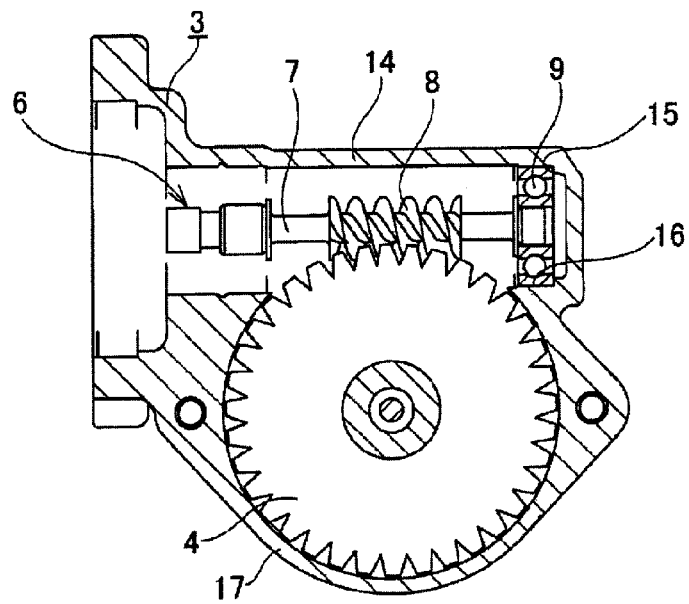
FIG. 6B is a cross-sectional view illustrating the assembling process of the worm reducer.
Figure 6C:
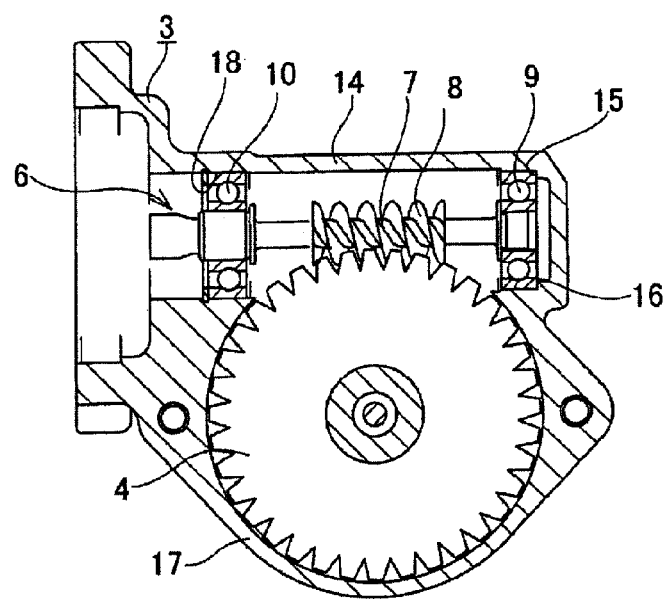
FIG. 6C is a cross-sectional view illustrating the assembling process of the worm reducer.

A second example of the embodiment of the present invention will be described below with reference to FIG. 3. In the case of the present example, in order to reduce the thrust required for pushing the piston rod 63 when the expansion and contraction portions 62a and 62a constituting the clamp main body 49a are pushed outward to be expanded in the radial direction, the thickness in the radial direction of the thin wall portion 60a formed at a portion near the distal end of an intermediate cylinder 51a is set to be smaller than that in the first example of the embodiment described above. Therefore, when the piston rod 63 and the cam portion 64 provided at the distal end of the piston rod 63 are moved backward in the Z-axis direction, the elastic restoring force of the expansion and contraction portions 62a and 62a is reduced. Therefore, in the case of the present example, in order to facilitate deformation of each of the expansion and contraction portions 62a and 62a in a radially inward direction, circumferential grooves 66 and 66 having a partially circular cross section are formed in the outer circumferential surfaces of the expansion and contraction portions 62a and 62a, and an O-ring 67 made of an elastic material is externally fitted into the circumferential grooves 66 and 66 in a connecting manner. Therefore, each of the expansion and contraction portions 62a and 62a can be easily deformed in the radially inward direction due to the radially inward elastic force of the O-ring 67. Further, since an outer peripheral edge of the O-ring 67 protrudes outward in the radial direction from the circumferential grooves 66 and 66, the outer peripheral surface of the O-ring 67 can be brought into contact with the inner peripheral surface of the inner ring 21. Therefore, the force of gripping the inner ring 21 is enhanced.

Other constructions and operational effects are the same as those of the first example of the embodiment.

Although the present application has been described in detail with reference to specific embodiments, those skilled in the art would appreciate that various changes and modifications are possible without departing from the spirit and scope of the invention.

This application is based on Japanese Patent Application (Japanese Patent Application No. 2015-039927) filed on Mar. 2, 2015, the contents of which are incorporated herein by reference.

INDUSTRIAL APPLICABILITY

In addition, when implementing the present invention, as the mechanism for floatingly supporting the apparatus main body such that the apparatus main body is movable with respect to the movable carriage, an elastic member can be used instead of the air cylinder. In addition, when implementing the present invention, as the driving devices of the outer ring supporting mechanism and the inner ring clamping mechanism, an electric motor can be used instead of the cylinder device. In this case, a mechanism for converting rotational motion into linear motion, such as a feed screw mechanism can be used in combination with the mechanisms presented in the examples described above. Furthermore, as long as each of the outer ring supporting mechanism, the inner ring clamping mechanism, and the guide mechanism can perform their own function, their structures are not limited to the structures described in the section of the embodiment, but various structures can be adopted therefor.

DESCRIPTION OF REFERENCE NUMERALS AND SIGNS

1 Steering wheel
2 Steering shaft
3 Housing
4 Worm wheel
5 Electric motor
6 Worm
7 Worm shaft
8 Worm tooth
9 Distal end bearing
10 Base end bearing
11 Output shaft
12 Spline hole
13 Spline shaft portion
14 Worm accommodation portion
15 Abutting portion
16 Bearing receiving portion
17 Worm wheel accommodation portion
18 Bearing receiving portion
19 Bearing insertion apparatus
20 Outer ring
21 Inner ring
22 Ball
23 Motor side end surface
24 Base
25 Movable carriage
26 Apparatus main body
27 Guide mechanism
28 Driving mechanism
29 First mounting plate
30 Second mounting plate
31 Mount
32a, 32b Horizontal linear guide
33 Vertical linear guide
34 Air cylinder
36a, 36b, 36c Guide rail
37a, 37b Slider
38 Piston
39 Cylinder main body
40 Outer ring supporting mechanism
41 Inner ring clamping mechanism
42 Outer ring supporting cylinder
43 Cylinder driving device
44 Chamfered portion
45 Distal end surface
46 Mounting flange
47 Driving rod
48 Cylinder main body
49, 49a Clamp main body
50 Clamp driving device
51, 51a Intermediate cylinder
52 Cylinder main body
53 Through hole
54 Small diameter hole portion
55 Open hole portion
56 Accommodation hole portion
57 Inclined surface portion
58 Cylindrical surface portion
59 Stepped surface portion
60, 60a Thin wall portion
61 Slit
62, 62a Expansion and contraction portion
63 Piston rod
64 Cam portion
65 Inclined surface
66 Circumferential groove
67 O-ring

The invention claimed is:

1. A bearing insertion apparatus comprising:
a base;
a movable carriage provided to be movable in a horizontal Z-axis direction on the base; and
an apparatus main body supported to be freely movable in a predetermined direction with respect to the movable carriage, wherein:
the apparatus main body includes: an elongated hollow cylinder-shaped outer ring supporting cylinder having a distal end surface that is brought into contact with a side surface of an outer ring constituting a rolling bearing such that positioning of the rolling bearing in the Z-axis direction is performed; and an inner ring clamping mechanism gripping an inner peripheral surface of an inner ring constituting the rolling bearing by expanding and contracting a clamp main body provided at a portion protruding from a distal end of the outer ring supporting cylinder; and the apparatus main body is structured to be freely movable with respect to the movable carriage by being guided by a guide mechanism in a horizontal X-axis direction orthogonal to the Z-axis direction and in a vertical Y-axis direction orthogonal to both of the Z-axis direction and the X-axis direction, and the apparatus main body is floatingly supported in a state of being movable in the Y-axis direction within a predetermined range.

2. The bearing insertion apparatus according to claim 1, wherein the guide mechanism includes:

a horizontal linear guide allowing the apparatus main body to move with respect to the movable carriage in the X-axis direction; and a vertical linear guide allowing the apparatus main body to move with respect to the movable carriage in the Y-axis direction.

3. The bearing insertion apparatus according to claim 1, wherein the apparatus man body is provided with a cylindrical driving device, thereby moving the outer ring supporting cylinder in the Z-axis direction, independently of the inner ring clamping mechanism.

4. The bearing insertion apparatus according to claim 2, wherein the apparatus man body is provided with a cylindrical driving device, thereby moving the outer ring supporting cylinder in the Z-axis direction, independently of the inner ring clamping mechanism.

* * * * *